Sept. 22, 1953     P. E. RENOUX     2,652,898
DEVICE FOR STABILIZING ROTARY-WING AIRCRAFT
Filed July 3, 1948     8 Sheets-Sheet 1
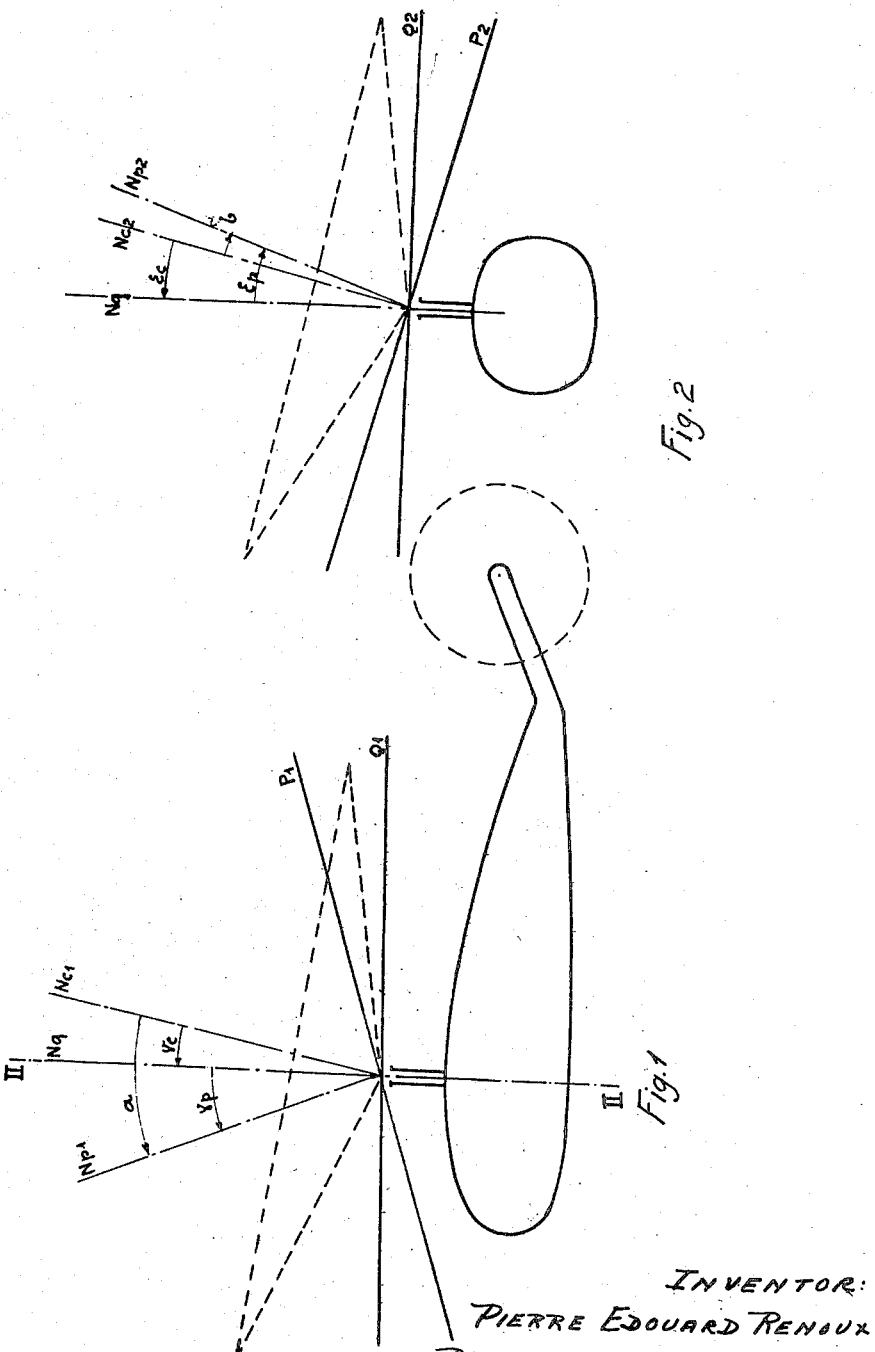
INVENTOR:
PIERRE EDOUARD RENOUX
By:
Haseltine, Lake & Co.
AGENTS Sept. 22, 1953  P. E. RENOUX  2,652,898
DEVICE FOR STABILIZING ROTARY-WING AIRCRAFT
Filed July 3, 1948  8 Sheets-Sheet 3

INVENTOR:
PIERRE EDOUARD RENOUX
By:
Haseltine, Lake & Co.
AGENTS

Sept. 22, 1953      P. E. RENOUX      2,652,898
DEVICE FOR STABILIZING ROTARY-WING AIRCRAFT
Filed July 3, 1948      8 Sheets-Sheet 4

INVENTOR:
PIERRE EDOUARD RENOUX
By:
Haseltine, Lake & Co.
AGENTS

Sept. 22, 1953　　　　　P. E. RENOUX　　　　　2,652,898
DEVICE FOR STABILIZING ROTARY-WING AIRCRAFT
Filed July 3, 1948　　　　　　　　　　　　　　8 Sheets-Sheet 5

INVENTOR:
PIERRE EDOUARD RENOUX
BY:
Haseltine, Lake & Co.
AGENTS

Sept. 22, 1953            P. E. RENOUX            2,652,898
DEVICE FOR STABILIZING ROTARY-WING AIRCRAFT
Filed July 3, 1948            8 Sheets-Sheet 6
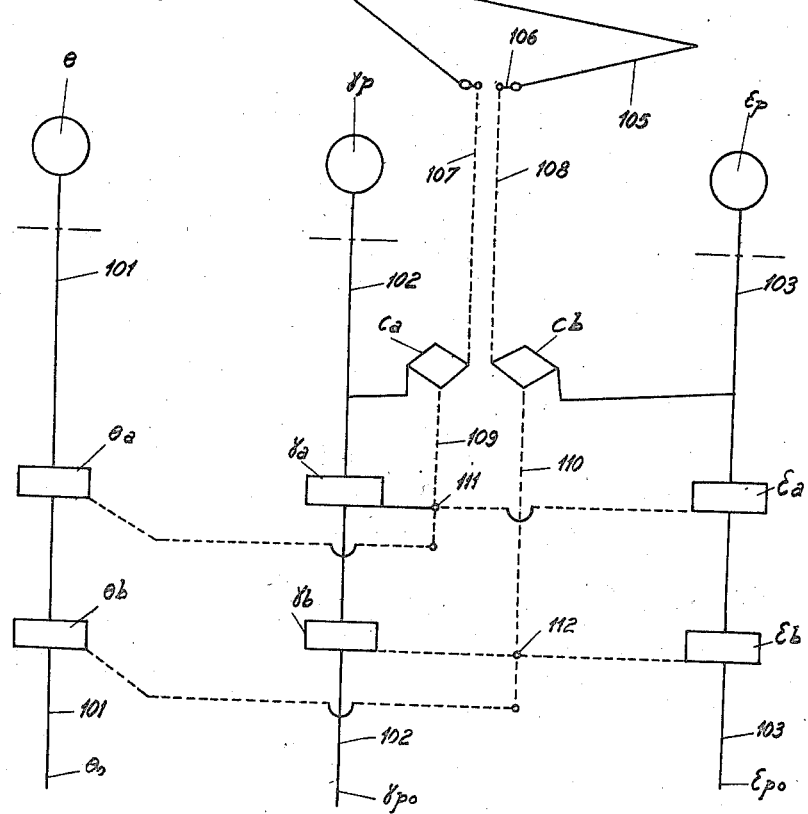
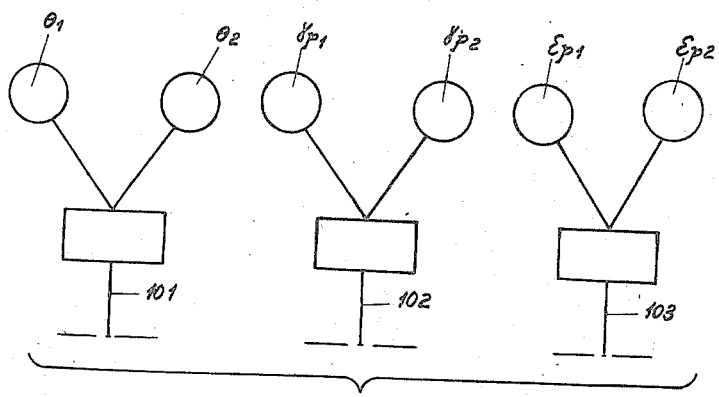
INVENTOR:
PIERRE EDOUARD RENOUX
By: Haseltine, Lake & Co.
AGENTS Sept. 22, 1953  P. E. RENOUX  2,652,898
DEVICE FOR STABILIZING ROTARY-WING AIRCRAFT
Filed July 3, 1948  8 Sheets-Sheet 7

Inventor:
Pierre Edouard Renoux
By:
Hazeltine, Lake & Co.
Agents

Patented Sept. 22, 1953

2,652,898

UNITED STATES PATENT OFFICE 2,652,898

DEVICE FOR STABILIZING ROTARY-WING AIRCRAFT

Pierre Edouard Renoux, Aix-en-Provence, France, assignor to S. A. Societe Nationale de Constructions Aeronautiques du Sud-Est Application July 3, 1948, Serial No. 36,896
In France February 18, 1948

6 Claims. (Cl. 170—160.25)

The present invention is directed to rotary wing aircraft provided with one or more rotor structures including rotor blades pivoted to a rotor hub and rotated either under the action of a source of power such as an engine or as a result of their construction in the form of jet-reaction blades or the like, or further rotated in auto-rotational conditions set up by the displacement of the aircraft. Aircrafts of such type are generally known as helicopters and autogyros and will hereinafter be designated by the generic term of gyroplanes.

The invention relates to a method of stabilizing gyroplanes in flight and means for carrying said method into effect.

It is well-known that gyroplanes are subject to instability effects especially noticeable at low speeds and in stationary or hovering condition. Such instability is characterized as a tendency of the gyroplane, after having been deviated from its position of balance by any disturbance, to start oscillating with over-increasing amplitudes. This obliges the pilot to exert constant control and piloting is thus made difficult and aircraft of such type hazardous to fly.

The principal object of this invention is to overcome those drawbacks and minimize the hazard of operating gyroplanes.

The method of the invention requires for its execution certain devices to be described hereafter and one of the chief practical features of which is that they are enormously lighter than the gyroscopic devices which it has been attempted to use heretofore in order to provide gyroplanes with flight-stability.

To facilitate understanding of this invention it will be well to define some of the chief characteristics of gyroplanes which will be referred to later on in the specification.

Fig. 1 is a diagrammatic sketch of a gyroplane illustrating the traces of the operative planes, axes, and angles of the rotor on the longiudinal plane of symmtery of the apparatus.

Fig. 2 is a similar front-end view of a gyroplane showing the traces of the operative planes, axes and angles of the rotor on a transverse plane extending through the axis of the rotor-supporting shaft, i. e. a plane, the trace of which in Fig. 1 is indicated by the line II—II.

Figure 3:
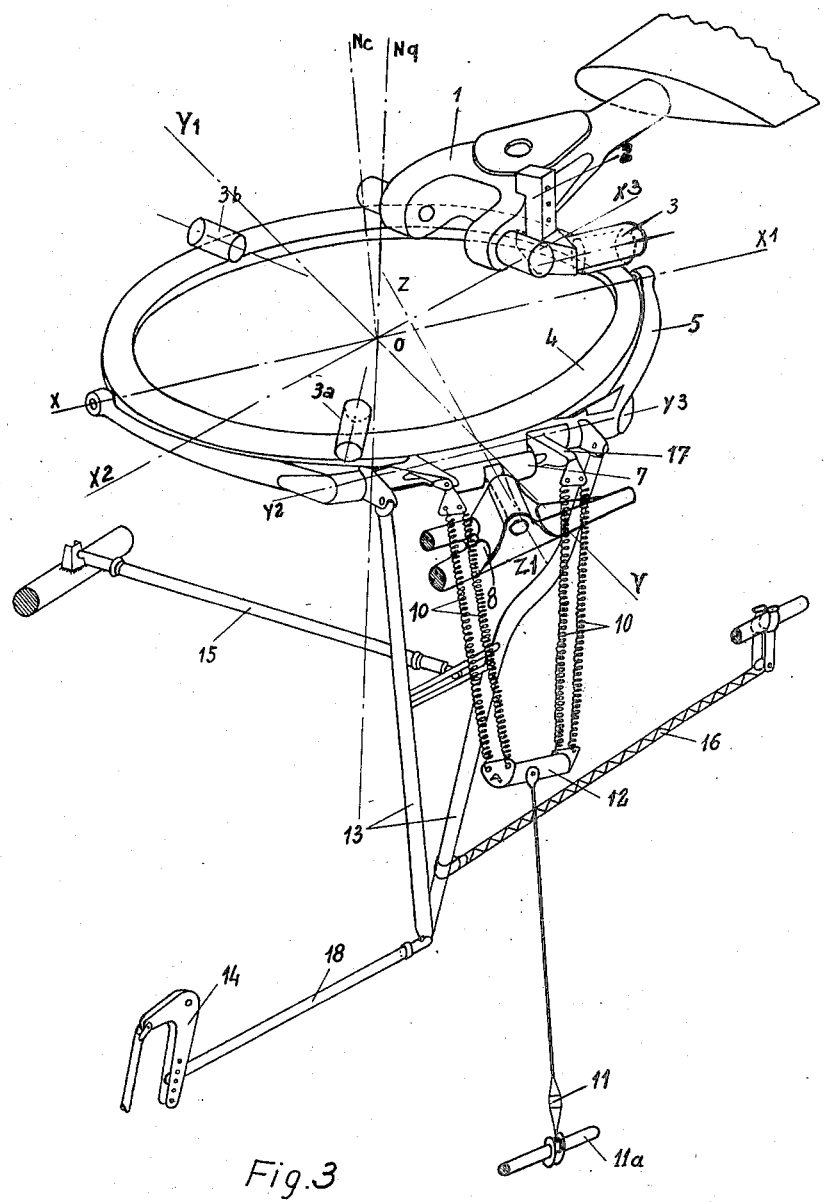

Said axis has a fixed position with respect to the body of the plane and will be termed the "structural axis," being designated by the symbol $N_q$. The plane Q normal to the structural axis is referred to as the structural plane and is also fixed with respect to the body of the gyroplane. The base or piloting or control plane P is a plane with respect to which the chord of the transverse aerofoil section of a rotor-blade profile forms a pitch-angle $\theta$ which remains constant in that rotation of the blade.

The control or piloting axis $N_p$ is a straight line normal to the control plane P. As a general rule it is located outside of the planes of Figs. 1 and 2.

In a rotor having cyclic blade-pitch control, the control plane is related to the position of the cyclic pitch-control mechanism by a law deriving from the kinematic relations existing between the displacements of the various blade incidence control levers, i. e. a law which derives from the construction of the gyroplane.

In a tiltable rotor the control axis is the axis of the inclined or tilted portion of the hub. And the control plane is a plane perpendicular to the control axis.

The "cone axis" $N_c$ is the axis of the cone described by the rotor blades in operation. Generally this axis is also contained in a plane outside the planes of Figs. 1 and 2.

The projections of the axes $N_p$ and $N_c$ on the longitudinal plane containing $N_q$ respectively are $N_{p1}$ and $N_{c1}$ (Fig. 1) while the projections on the transverse plane at right angles with said longitudinal plane are $N_{p2}$ and $N_{c2}$ (Fig. 2), the corresponding traces of the planes P and Q being $P_1$ and $Q_1$ on the one hand and $P_2$ and $Q_2$ on the other. The broken lines in the same figures indicate the traces of the blades and the projections of the blade-tips, thus indicating the projection of the cone formed by the rotor-blades.

The trim angles or longitudinal control angles relating to the axes $N_p$, $N_c$ in the plane of Fig. 1 are $\gamma_p$ and $\gamma_c$ with respect to the structural axis.

The list angles or lateral control angles relating to said axes $N_p$, $N_c$ in the plane of Fig. 2 are $\epsilon_p$ and $\epsilon_c$ with respect to the structural axis.

The tilting angle of the cone axis $N_c$ with respect to the control axis $N_p$ will be hereafter designated by $a$ in the longitudinal plane and $b$ in the transverse plane.

As will appear from Figs. 1 and 2 said angles are interrelated algebraically by the following equations:

$$a = \gamma_c + \gamma_p \qquad b = \epsilon_p + \epsilon_c$$

The magnitude and direction of the resultant of the aerodynamic forces developed by a rotor having blade pivoted to the hub, as measured with respect to the control-plane, essentially depend on the velocity of air with respect to the control-plane, the general pitch angle, the weight of the aircraft, the weight of the blades, the rotational speed of the rotor and some other accessory parameters. In the absence of any additional devices, and if the pilot does not exert any action, the position of the control plane is fixedly related to the structure of the gyroplane as a whole. Consequently the direction of the resultant of the aerodynamic forces with respect to the gyroplane and also its magnitude exclusively depend on the above-mentioned factors. The values of said factors being given, it is impossible to alter at will the relative amount of stability provided by the gyroplane rotor. In other words the influence of the rotor upon the over all stability of the gyroplane constructed as described is also invariably determined. It is a well-known fact that in rotor structures arranged as described conventional gyroplanes are subject to instability effects particularly noticeable at low speeds and in hovering conditions.

Thus if it is desired to provide an improved condition of stability, it will be necessary artificially to modify the law which determines the magnitude and position of the resultant with respect to the gyroplane in correlation with the above-listed variables on which operation of the rotor depends. For that purpose the method used in the invention consists of subjecting the controls of the rotor or rotors (control angles $\gamma_p$ and $\epsilon_p$ and general pitch angle $\theta$), to the action of the positional variations of the cone axis with respect to the control plane, the position of which axis is characterized by the tilt angles $a$ and $b$. The invention is based on the recognized fact that the resultant of the aerodynamic forces is interrelated with the blade-cone axis by a perfectly definite law; its direction is substantially that of the blade-cone axis.

It follows that if provision is made, through the use of suitable devices for the inclination of the cone axis with respect to the control plane to act upon the rotor controls, the law linking the magnitude and position with respect to the gyroplane of the resultant of aerodynamic forces of the rotor or rotors with the above-listed parameters upon which the operation of said rotor or rotors depends will be modified. Through suitably selecting the respective values and relative arrangements of the leverages of the combiner devices to be described hereinafter which are constituent elements of the stabilizing arrangement, it becomes possible to proportion at will the action exerted on the controls of the rotor or rotors by the variation in inclination of the cone axis, in such a way as to obtain any desired degree of over all stability in the gyroplane.

Other features of the invention will be made apparent in the course of the detailed description which follows which relates to various forms of embodiment of the method of the invention and devices for carrying said method into effect.

In a first form of embodiment a mechanism is provided for measuring the tilt or inclination angle of the cone described by the rotor blades and for introducing into the general pitch adjustment for the gyroplane rotor or rotors a correction the magnitude of which is a function of said angle.

In another form of embodiment there is provided a mechanism for measuring the tilt angle of the cone described by the rotor blades and introducing into the adjustment of the control plane of the gyroplane rotor or rotors a correction the value of which is a function of said angle.

A large number of combinations between both the above-defined aspects of the invention may be resorted within the scope of the invention, and the combinations which are to be described hereinafter have been selected by way of illustration and not of limitation of the manner in which the invention may be performed.

Fig. 3 is a perspective diagrammatic view of a first embodiment of a device for measuring the tilt angle of the cone axis.

Figure 4:
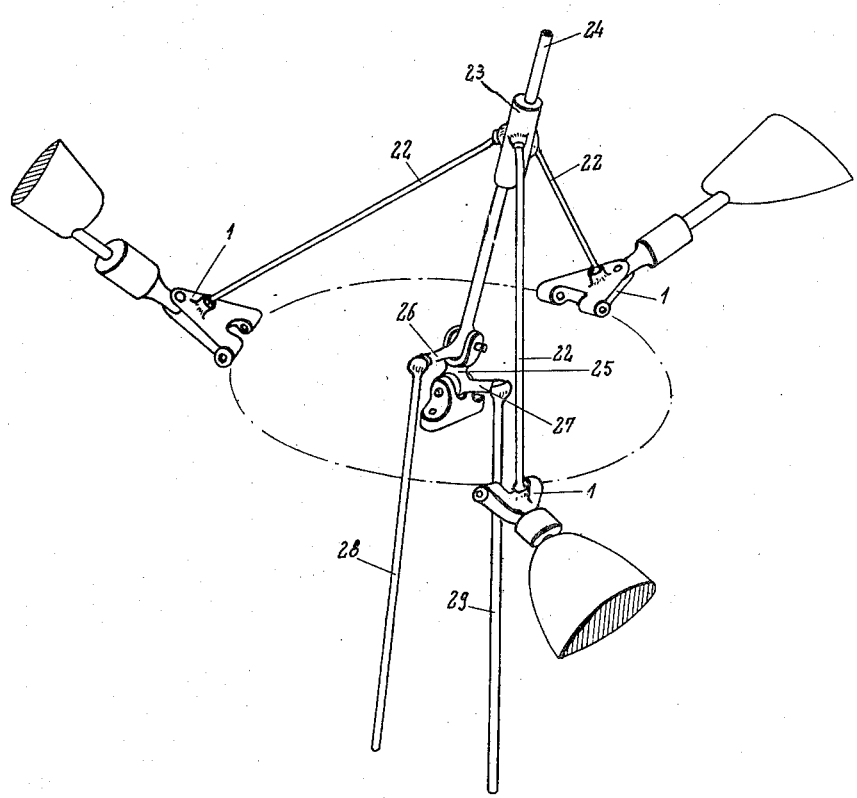

Fig. 4 similarly illustrates a second embodiment of such a device.

Figure 5:
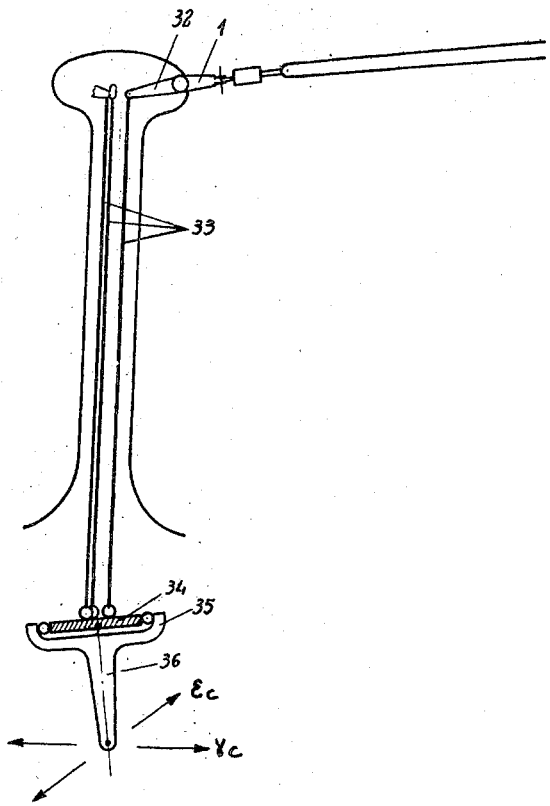

Fig. 5 is a view in vertical cross section of a third embodiment of the same device.

Figure 6:
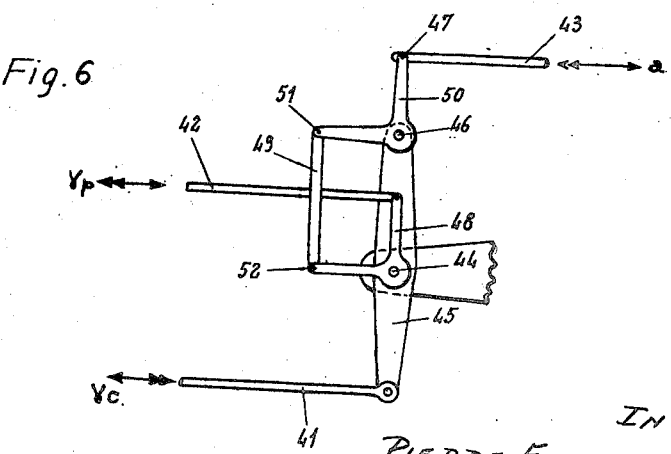

Fig. 6 illustrates a first embodiment of a so-called combiner device which is a constituent of a stabilizing arrangement according to the invention.

Figures 7, 8, 9:
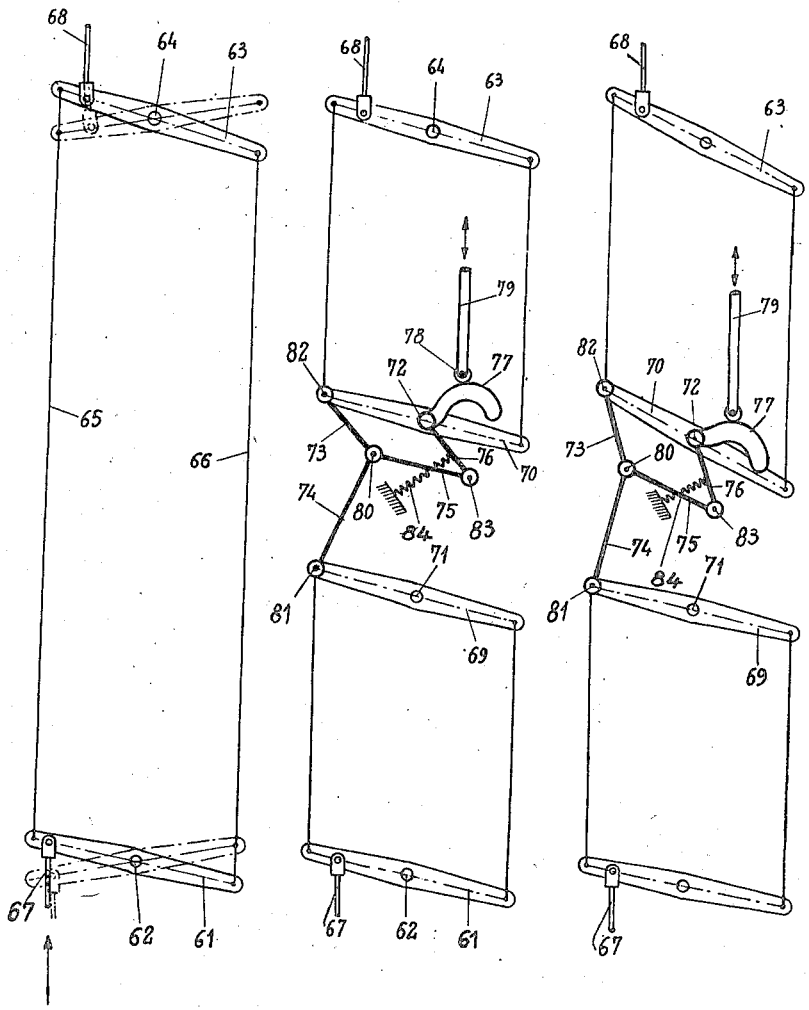

Figs. 7 to 9 included illustrate the introduction of another form of combiner unit into a control.

Fig. 10 is a general function diagram of a complete stabilizing assembly for a gyroplane according to the invention.

Fig. 11 shows a modification of a detail of the stabilizer arrangement diagrammatically shown in Fig. 10.

Figure 12:
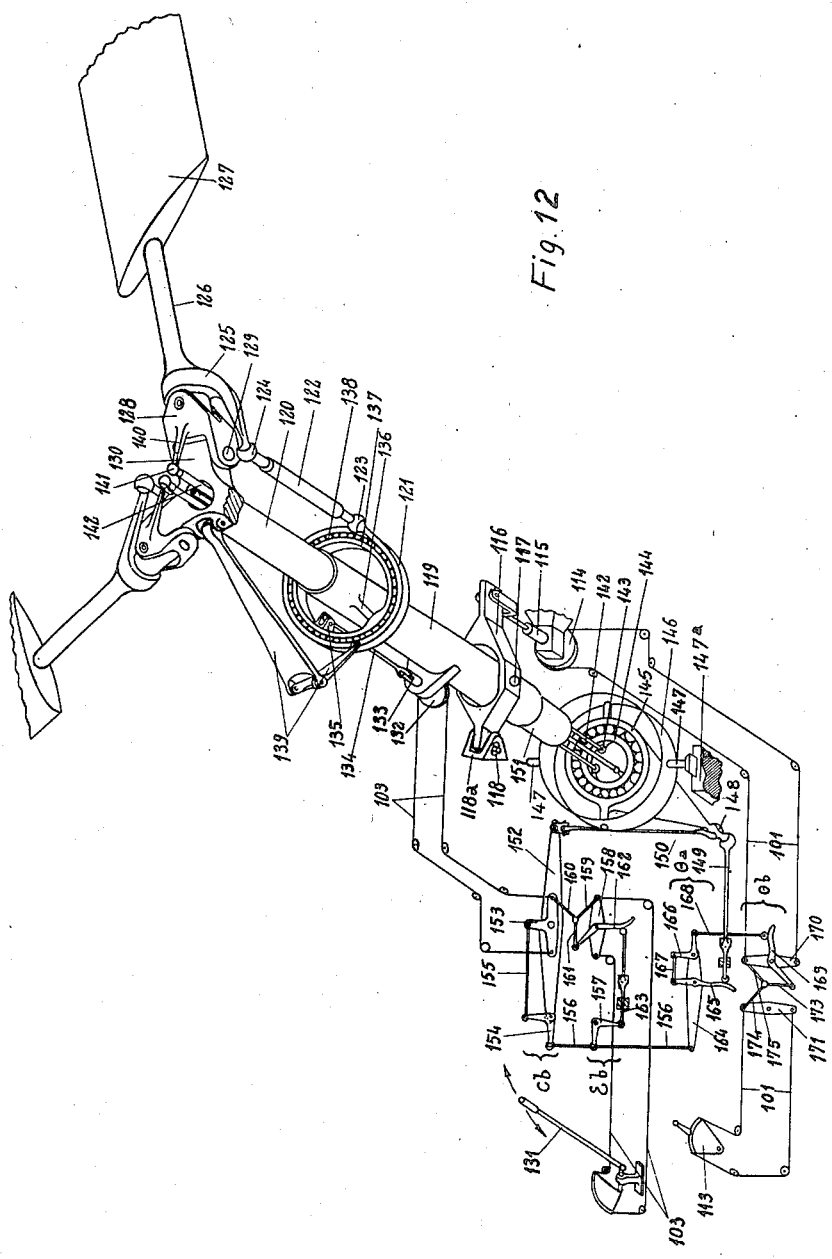

Fig. 12 shows in perspective and in diagrammatic form a first form of embodiment of a gyroplane stabilizing arrangement according to the invention.

Figure 13:
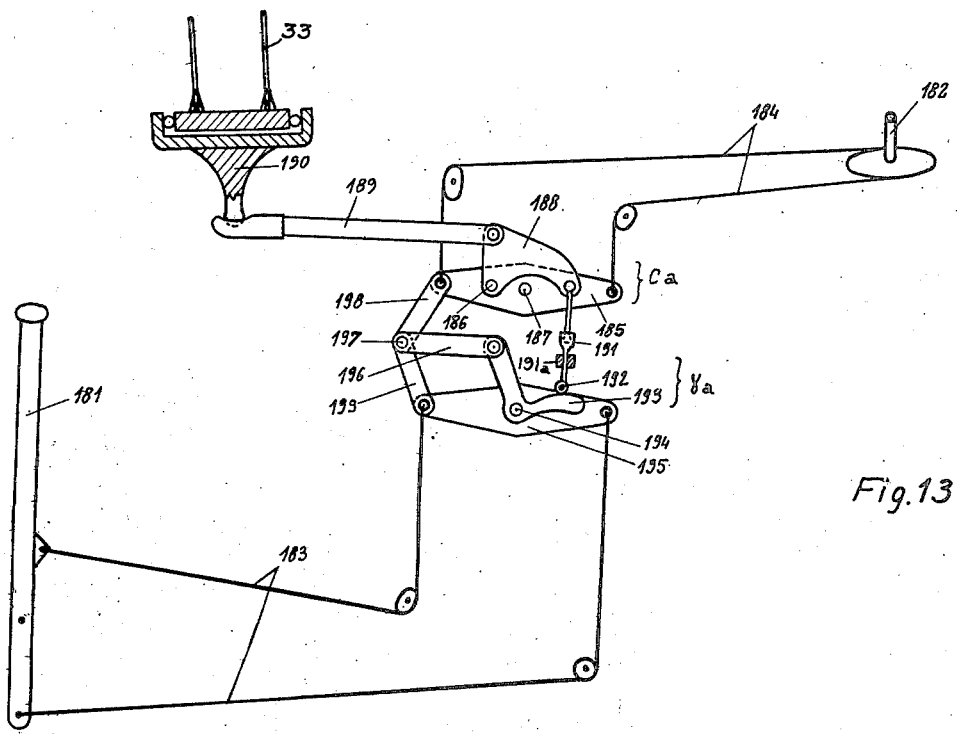

Fig. 13 is a similar showing of another form of embodiment of said arrangement.

There will first be described three forms of embodiment of the measuring device for indicating the tilt angle of the cone axis.

Fig. 3 illustrates a first form of embodiment of that device.

Each rotor connector link 1 of the main rotor has secured thereto a supporting bracket 2 supporting a roller 3. For greater clarity in the drawing only a single blade with its connector link has been shown, but it will be understood that the rotor shown comprises three blades spaced 120° from each other, the roller for a second blade being shown at 3a and the roller for the third blade at 3b. The three rollers ride on an annulus 4 comprising for instance a ring of steel tubing flattened in cross section and carrying a roll-way which may be formed as a strip of hard rubberized fabric stitched or adhesively secured thereto so as to provide a roll-way adapted to ensure perfect driving engagement with the rollers 3, 3a, 3b.

The annulus 4 is suspended at both ends of a diameter X—X₁ thereof from a fork member 5 pivoted to an intermediate T-shaped member 7, said fork being pivotable about an inclined axis Z—Z₁ of a support 6 rigidly connected with the fuselage of the gyroplane. The axis X—X₁ defines with the longitudinal axis X₂—X₃ of the gyroplane an angle defined in a manner to be described later.

The annulus 4 is applied against the rollers 3, 3a, 3b by springs 10 secured at one of their ends to the fuselage through a tensioning device 11 making it possible to adjust their initial tension and at their other ends to lugs 17 extending from the axis Y₂—Y₃ in an opposite direction to the arms of the fork-member 5.

The intermediate balance member 12 at both ends of which the springs 10 are attached is provided for the purpose of avoiding interference of the springs 10 with the oscillatory movements of the structure about the axis Z—Z₁. The fork 5 has suspended therefrom through pivotal connections a V-member 13 adapted through a link 18 pivoted at both ends thereof, to operate the repeater horn or lever 14. Laterally the V-member 13 is maintained by means of a stay 15 pivoted at its opposite end on a fixed point of the aircraft and which constrains it to move parallel with the axis $X—X_1$.

A resilient member 16 which may comprise an elastic cord or the like provided with adjusting means effects compensation for any stresses which may be introduced into the control system by the repeater horn 14 and the devices operated by said horn.

Since in each blade the roller 3 is circumferentially spaced from the connector link 1 of the corresponding blade, the annulus applied against the under surface of the rollers 3, 3a and 3b is adapted to follow-up the tilt of the blade-cone with a lag or displacement corresponding to the angle included between the direction of the blade axis and that of the axis of the roller 3. It is this angular displacement that is equal to the angle included between the axes $X—X_1$ and $X_2—X_3$. In the embodiment shown the angular displacement or lag is 26°; it would be quite possible however to construct a similar device wherein said angle would have a much smaller value or in which it would be equal to zero.

The oscillatory displacements of the annulus 4 about its suspension axis $X—X_1$ are not measured. On the other hand the oscillatory movements effected by said annulus about the axis $Y—Y_1$ at right angles to $X—X_1$ in the plane of the annulus 4 are adapted to rotate the V-member about the axis $Z—Z_1$ while the vertical displacements thereof will rock the fork-member 5 about the axis $Y_2—Y_3$ parallel to the axis $X—X_1$. The inclination of the axis $Z—Z_1$ is so predetermined as to cause the rollers 3, 3a, 3b to ride upon the annulus with a minimum amount of lateral slippage.

The oscillations of the fork 5 around the axis $Z—Z_1$ are transmitted to the V-member 13 which in turn transmits them through the link 18 to the horn 14. From the horn there extends a rod or link or equivalent means adapted to transmit the variations of $\gamma_c$ to the devices on which they are supposed to act.

By way of indication merely, it may be stated that for a given type of gyroplane, and for a value of $\gamma_c$ equal to 1 degree there corresponds an inclination of 0.476 degree for the annulus 4 and an amplitude of displacement of about 0.2 inch for the end of the fork 13. Of course in such a device any play should be strictly eliminated and this may readily be provided for through various known means.

The device just described, as will be apparent, is adapted only to measure the component $\gamma_c$ of the tilt-angle of the cone axis on the longitudinal plane of the aircraft, account being taken of the angular displacement between $X—X_1$ and $X_2—X_3$.

Should it for any reason become necessary or desirable to indicate two components of the cone axis tilt-angle, it will be necessary to use a measuring device of which Fig. 4 shows one exemplary embodiment.

As shown in this figure the blade connectors 1 of the main rotor have universally pivoted thereto rods 22 all equal in length, the free ends of which are universally pivoted to a bush 23 slidable on a rod 24. The rod 24 is universally pivoted to the center of the rotor hub through a universal joint 25. It thus is tiltable in any direction. It follows that its direction will coincide with that of the virtual cone axis of the blades. An equal amount of upward movement in all of the blades will not affect the inclination of the rod 24 and its only result will be to cause the bush 23 to slide along the rod 24.

Thus the rod 24 is effective to indicate both the longitudinal and the lateral tilt angles of the blade-cone. To accomplish such measurement there is provided at the lower end of the rod 24 a lever 26 integral therewith and upon the universal joint element 25 an arm 27 is provided integral with said element, the lever arm 27 being arranged to pivot about a horizontal axis at right angles to the horizontal pivotal axis of the lever arm 26. Thus the angular displacements of both lever arms 26 and 27 are adapted to indicate separately the longitudinal and the lateral tilt angles of the blade cone respectively. 28 and 29 designate rods respectively universally pivoted to the ends of the levers 26 and 27 and adapted to transmit the oscillatory movements of the arms 26 and 27 to the desired controls.

The embodiment of the cone-axis tilt angle measuring device which has just been described is comparatively space-consuming in the upper part of the gyroplane. Where space requirements do not allow of such an arrangement being mounted another form of embodiment may be adopted as illustrated in a very diagrammatic manner in Fig. 5.

In this embodiment the elements necessary for measuring the cone axis tilt angle are removed to a point outside the rotor head.

The connectors 1 of each rotor blade are extended inwardly of the rotor hub by levers 32 the oscillatory movements of which are transmitted by a push-pull rod 33 to a circular disc 34 rotatable with the rotor. It will be seen that when the blade is raised the arm 32 is rocked downwardly and therefore the disc 34 is similarly lowered, while reversely when the blade is lowered the disc 34 will be raised. It follows that the oscillatory movements of the disc 3, will be in symmetrical or opposite relationship with those effected by the blade-tips. The disc 34 revolves in a run-way within a casing 35 the angular orientations of which are transmitted to a lever 36 integral with said casing. A suitable device not shown in the drawings is used to urge the disc 34 through the medium of its mounting 35 against the lower ends of the rod 33.

Thus the magnitudes of the longitudinal and lateral tilt angles of the cone-axis are measured by the displacements effected by the lower end of the lever 36 along two mutually perpendicular directions indicated in perspective by the arrows in Fig. 5 and each of which will therefore correspond with the measurement of the components $\gamma_c$ and $\epsilon_c$ of the cone axis tilt angle.

All of the above-described devices are actually adapted to measure the inclination or tilt angle of the axis of the cone which is effectively described by the blades in their rotation, with respect to the structural axis and not the control axis.

However as shown previously $a=\gamma_c+\gamma_p$ and $b=\epsilon_p+\epsilon_c$. Moreover, it has been shown that $\gamma_p$ and $\epsilon_p$ are given by the cyclic pitch varying mechanism or the rotor tilting mechanism. It is only necessary therefore in order to obtain the values of $a$ and $b$ to additively combine the angles $\gamma_p$ and $\epsilon_p$ given by the rotor controls and the angles $\gamma_c$ and $\epsilon_c$ given by the cone axis tilt angle measuring device.

For this purpose, various means may be used.

According to one embodiment of the invention to be described by way of example, a kinematic combiner unit is used, one form of construction of which is shown in Fig. 6.

As shown the rod 41 is movable lengthwise under the action of the above-described device for measuring $\gamma_c$, while the rod 42 similarly measures $\gamma_p$. In such conditions the rod 43 will measure $a$, the positive values thereof being measured in the direction indicated by the two-headed arrows in the figure. This result is obtained as follows:

A large lever 45 is pivoted on a fixed pivot 44 and the oscillations of the rod 41 are transmitted to the end 46 of the lever 45. The fixed pivot 44 also has pivotally mounted on it a bell-crank lever 48 having rectangular arms to which the movements from the rod 42 are transmitted. A similar square bell-crank lever 50 pivoted on the free end 46 of the large lever 45 has its horizontal arm connected through a pivoted rod 49 with the end of the horizontal arm of the square bell-crank 48. The opposite end 47 of the bell-crank 50 is pivoted to the rod 43. The end of the horizontal arm of the bell-crank 50 is designated 51 and that of the horizontal arm of the lever 48 is designated 52. It will be seen that the points 44, 46, 51 and 52 form the respective apices of a parallelogram. The bell-cranks 48 and 50 therefore always remain with their arms in respectively parallel relationship regardless of the inclination of the large lever 45. Any displacement of the push-pull rod 42 irrespective of the displacements of the rod 41 is therefore reproduced with strict fidelity by the movements of the rod 43. Similarly whenever the rod 41 is moved, the point 46 is shifted in an opposite direction by a proportionate amount and so does the point 47, but since the bell-crank 48 is not pivoted about the pin 44 when the lever 45 is pivoted under the action of the rod 41, the vertical branch of the bell-crank 48 retains its vertical condition and consequently so does the vertical branch of the bell-crank 50. It follows that regardless of the particular position of the rod 42 any independent displacement of the rod 41 is integrally transmitted to the rod 43.

Should the rods 41 and 42 be moved simultaneously their effects will combine without however any one of said rods exerting an action on the other one and, as a result, the movements transmitted to the rod 43 effectively will be equal or proportional to the total of the displacements of the rods 41 and 42. In other words the displacements of the rod 43 do represent the total displacements $\gamma_c$ plus $\gamma_p$, that is $a$.

Figs. 8 and 9 show another form of embodiment of such a combining device as viewed in the stabilizing arrangement to be generally described somewhat later.

Said combiner is inserted in a portion, shown in Fig. 7, of a cable operated control system which it is desired to subject to the action of the longitudinal control angle for instance. Said control system includes two levers 61 and 63 respectively pivoted on fixed pivots 62 and 64 and rigidly connected in the rotational movements thereof through tightly stretched cables or rigid rods 65 and 66. 67 shows the input end from a control linkage and 68 its output towards the element to be controlled.

The device which is to be provided has to fulfill the folowing requisites:

1. If the cone-axis tilt angle remains constant, any rotation of the lever 61 should produce an equivalent rotation of the lever 63.

2. If the cone-axis tilt angle is varied, such variation should produce rotation of the lever 63 with respect to the lever 61, said relative rotation being a function of the cone-axis tilt angle.

For that purpose it is only necessary as shown in Fig. 8 to interpose in the cables 65 and 66 an additional pair of levers of similar length 69 and 70 pivoted on fixed pins 71 and 72 respectively and interconnected through a leverage comprising the mutually pivoted rods 73, 74, 75, 76. The rods 73, 75 and 76 constitute together with the lever 70 a parallel linkage system the apices of which are 72, 82, 80 and 83. The rod 73 will thus at all times remain parallel to the rod 76. The rod 76 is pivoted on a fixed pivot 72 and is rigid with a cam member 77 engaging a follower roller 78. The follower roller is adapted through a rod 79 to receive the movements of the rod 43 of the combiner unit shown in Fig. 6. A spring 84 operating in compression retains the cam 77 in constant engagement with the roller 78.

With this device the variations in the cone-axis tilt angle are expressed as or converted into rotational movements of the rod 76 and the rod 73, while the cam 77 makes it possible by suitably altering the contour of said cam to provide any desired law for transmission of the value of the cone axis tilt angle.

With this device, whenever the cone axis tilt angle or the component $\gamma_c$ used remains constant, the lever 73 constantly remains parallel with a common direction during operation of the control system 67—68, because the lever 76 itself remains stationary and in engagement with the roller 78 while the rods 73 and 76 remain parallel with each other. It follows that as the levers 69 and 70 are swung on their pivots under the action of the identical pivotal movements of the levers 61 and 63 in response to the movements impressed on the control system 67—68, the triangle 82, 80, 81 remains undeformed and constitutes in effect a link of fixed length interconnecting the levers 69 and 70 which are rotated in unison. Any rotational movement of the lever 61 is therefore transmitted to the lever 63 and the general effect is the same as if the intermediate device were absent.

If on the other hand the angle $\gamma_c$ varies in value, such variation will cause a pivotal movement of the cam 77 and thereby of the rods 76 and 73 and consequently will cause a distortion of the triangle 82, 80, 81 and assuming that in Fig. 8 the cam 77 rotates clockwise, there will result an increase in the spacing between the pivotal points 81 and 82; in other words the lever 70 will rotate relatively to the lever 69 thus introducing into the control system 67—68 a correction which will be a function of the value of the angle $\gamma_c$. This position is illustrated in Fig. 9.

The control system 67—68 may be constituted either by the general pitch control of the main rotor or the cyclic pitch control or the tilt control for the rotor or rotors of the gyroplane.

While there has so far been described by way of example an embodiment of the stabilizing method of the invention which makes use of mechanical means, it will be understood however that the invention is characterized by the feature which consists of introducing, into the control of the general pitch and the position of the control plane of the rotor or rotors of the gyroplane, a correction which is a function of the variations in the rotor cone axis tilt angle and that this feature may be embodied through the use of other than mechanical means such as electric, hydraulic or pneumatic means of various conventionally used types.

In particular the cone axis tilt angle measuring mechanism may be made to shift a slide-valve controlling a hydraulic servo-motor supplied from the pressure oil system of the gyroplane. Said servo-motor will introduce the desired correction into the controls of the rotor or rotors.

Another possible embodiment will consist of actuating through the cone axis tilt angle measuring mechanism an electric pilot member such as a potentiometer or a variable impedance or other similar means.

Said pilot member may be adapted through the use of suitable known electric circuits to control a servo-motor operative to introduce the desired correction into the controls for the rotor or rotors of the air craft. The relative importance of said correction in response to the cone axis tilt angle may be proportioned at will through selecting a suitable pattern for the parts of the hydraulic slide-valve and or the characteristics of the electric circuits, or further through any other known method of adjusting the response of a servo-control system. There may thus be obtained any desired degree of over all stability for the gyroplane.

There will now be described the general diagram of a complete gyroplane stabilizing arrangement according to the invention in its broadest aspect, as shown in Fig. 10.

In this figure 101 designates the general pitch control $\theta$, 102 designates the control for the longitudinal control angle $\gamma_p$ and 103 indicates the control for the lateral control angle $\epsilon_p$; 105 represents the cone described by the rotor blades; 106 indicates the devices for measuring the cone axis tilt angle, the component $\gamma_c$ of said angle being transmitted through 107, and the component $\epsilon_a$ being transmitted through 108 to the combiner units $C_a$ and $C_b$ respectively which are adapted, on one hand, to receive the values of $\gamma_p$ and $\epsilon_p$ respectively and, on the other hand, to supply as described above at the outputs thereof the values of $a$ and $b$ respectively, said values being transmitted through 109 and 110 to the points 111 and 112 and thence to the respective combiner units $\theta_a$ and $\theta_b$ which are effective to combine $a$ with $\theta_0$ which latter value is supplied by the pilot through acting on the $\theta$ control and similarly to combine $b$ with $\theta_0$. The combiners $\gamma_a$, $\gamma_b$, $\epsilon_a$, $\epsilon_b$ provide for the corresponding combinations with $\gamma_{po}$, $\epsilon_{po}$, the latter being the respective values of the control angles as supplied by the pilot, while $\gamma_p$ and $\epsilon_p$ are the actual values effectively produced in the corresponding elements of the aircraft.

In a gyroplane provided with two main rotors, the control system for the general pitch angle $\theta$, and the control systems for the angles $\gamma_p$ and $\epsilon_p$ are subdivided into two sections as shown in Fig. 11.

In this figure $\theta_1$, $\gamma_{p1}$, $\epsilon_{p1}$ designate the parameters relating to the first rotor while $\theta_2$, $\gamma_{p2}$, $\epsilon_{p2}$ refer to the second rotor. Where more than two rotors are present the other corresponding angles $\theta_n$, $\gamma_{pn}$, $\epsilon_{pn}$ relating to the Nth rotor may be determined from the controls 101, 102, 103.

In actual practice an automatic gyroplane stabilizing device according to the invention will only exceptionally include all of the elements shown in the diagram of Fig. 10, and the embodiments described hereinafter will only comprise some of these elements. The elements selected to constitute a stabilizing device will depend on various considerations of a practical character such as the type of aircraft used, the presence or absence of auxiliary rotors and the number of such rotors if any, the type of control surfaces used and the characteristics thereof, the defects in stability inherent to the gyroplane under consideration and so on.

Fig. 12 illustrates in perspective and diagrammatically one embodiment of the stabilizing device wherein use is made in accordance with the method of the present invention of the indications provided by the device for measuring $\gamma_c$ and $\epsilon_c$, i. e. the components of the cone-axis tilt angle, for acting upon the general pitch angle $\theta$ and the lateral angle $\epsilon_p$. The device will accordingly include (as see Figs. 10 and 12) the combiners $C_b$, $\epsilon_b$, $\theta_a$ and $\theta_b$.

Said combiners are as shown in the general diagram of Fig. 10 inserted in the general pitch control device 101 and the lateral control angle control device 103.

It will be seen in Fig. 12 that the pitch-lever or device 113 with which the pilot is provided for adjusting the value of the general pitch accomplishes such control through the medium of cables 101 passing over guide-pulleys and a control pulley 114 controlling a jack 115 which through its up-and-down movements is adapted to impart to a collar-member 116 pivotal movements in upward and downward directions around a pivot-pin 118 slidable in an elongated aperture in a support bracket 118a, said collar being adapted by means of a pin 117 to actuate a tube 119 coaxial with the tube 120 through which the engine of the gyroplane drives the rotor-blades 127. For that purpose the engine is connected to said shaft through any appropriate means as for instance a gearing not shown, the last driven gear of which is secured on the shaft 120, for instance, as in known constructions, on the lower end 151 of said shaft. The shaft 120 at its top supports a hub 130 to which each blade is secured through a horizontal pivot 129, a connector-link 128 and a shank 126 supporting the blade 127 itself. The shank 126 is secured to the link 128 in known manner so as to be rotatable about its longitudinal axis under the action of the general pitch-adjusting mechanism and the cyclic pitch adjusting mechanism.

For that purpose, the outer tube 119 carries a horizontally extending pin 136 on which is pivoted a ring 137 around which in turn an outer ring 121 is rotatable. Between the rings 137 and 121 ball members are interposed for reducing friction between said rings. The outer ring 121 is driven in rotation about the rotor axis through the use of a two-armed drive linkage 139 connecting the ring 121 with the rotor hub 130. The ring 121 carries swivel ball members . . . 123 one for each blade around which there is swivellingly mounted a ring 122 connected through another ball-and-socket joint 124 at its opposite end with the lever 125 rigid with the blade.

It will thus be seen that as the jack 115 causes the tube 119 to move up and down, said tube is operative through the pin 136 and the ring 137 to actuate the ring 121 in upward and downward movements which through the link 122 and the arm 125 are converted into pivotal movements of the rotor blade 127 about its longitudinal axis, i. e. variations in its pitch-angle. Similar devices being provided for each of the rotor blades, the pitch angle of each blade will be altered a similar amount through actuation of the jack 115.

The cyclic pitch variations are effected from a control lever 131 through transverse displacements of the latter and through the control system 103 comprising cables extending over guide-pulleys and over the control pulley 132 actuating a jack 133 which through a link 134 attached by means of the pivotal connection 133 to the ring 137, causes the latter to pivot about the pin 136 when the jack itself is moved up or down.

It follows that when the jack 133 has been displaced from the position thereof in which it maintains the ring 137 and therefore also the ring 121 horizontal, said last-mentioned ring will be positioned in an oblique plane and the link 122 will be subjected during each revolution to an up-and-down reciprocation which through the arm 125 is converted into a cyclic variation of the pitch-angle for each rotor blade 127.

140 designates an arm integral with the connector-link 128, said arm terminating in a ball member 141 swivelled to a push-rod 142 extending through the interior of the shaft 120 and controlling at its lower end through another ball-and-socket joint 143 a ring 144 connected through a set of antifriction ball-members with an outer ring 145 universally mounted through the medium of annulus 146 on two spigots 147 each rigid with a slidable dove-tail means 147a only one of which has been shown. The other blades comprise similar mechanisms to the means 140, 141, 142, 143 so that the whole assembly of the above-described means forms a measuring device for indicating the angle defined between the plane of the blade-tips and the structural plane.

The ring 145 terminates downwardly in a ball-and-socket member 148 the movements of which provide the blade cone tilt angle components.

Said components are respectively transmitted through the pivoted and guided link 149 to the combiner $\theta_a$ and through the pivoted link 150 to the combiner $C_b$, thence through link 155, balance-lever 164 and link 168 to the combiner $\theta_b$. Between the ends of the link 156 there is secured a bell-crank lever 157 which through the pivoted and guided link 163 transmits the value of said component to the combiner $\epsilon_b$.

The combiner $\theta_a$ is composed of a balance-lever 164 around the axis of which there is pivotably mounted a cam 165 controlled by the link 149, while at its other end the cam 165 is connected through a link 167 to a rectangular bell-crank lever 166 pivoted to the opposite end of the balance lever 164 and connected through the link 168 which terminates in a follower roller with the cam 169 of the combiner $\theta_b$.

This last-mentioned combiner is made up of two similar balance-levers 170 and 171 connected at each end thereof to the cables 101. Around the axis of the balance lever 170 there is pivoted a cam 169 connected at its lower end through a pivoted link 173 and a pivoted link 174 with one end of the balance member 171 and through the link 175 to the corresponding end of the balance member 170.

The combiner $C_b$ comprises a balance lever 152 on the pivotal axis of which there is also pivoted a T-shaped balance member 153 the intermediate arm of which has pivoted to its free end a link 155 pivotally connected at its other end with a rectangular bell-crank 154 pivoted to one end of the balance member 152. The balance member 153 has attached to the opposite ends of the larger arms thereof the respective ends of the cable 103 extending around the pulley 132.

The combiner $\epsilon_b$ is composed of a balance member 158 having its ends attached to the ends of the section of the cable 103 which extends around a sector rigid with the control lever 131 controlling the lateral control angle. On the pivot axis of the balance member 158 there is also pivoted a cam 162 connected at one end through a pivoted link 161 and a pivoted link 159 with one end of the balance member 158 and through another pivoted link 160 with one end of the T-shaped balance member 153. The bell crank 157 pivoted at one end to the link 156 is pivoted at its opposite end to a link 163 which supports at its other end a cam-follower roller engaging the cam 162.

It will thus be seen that between the various combiners and controls connections have thus been provided which conform to the general functional diagram of Fig. 10 and which make it possible to cause the blade-cone tilt angle variations to act both on the general pitch and the cyclic pitch control.

Through imparting the desired contour to the various cams 162, 165, 169 it is possible to vary to any required extent the degree of influence of the blade cone tilt angle on the general pitch and the cyclic pitch variations of the blades.

Fig. 13 represents a form of embodiment of a device wherein use is made only of the longitudinal cone axis tilt angle to control therefrom only the longitudinal or depth control. Accordingly this device only comprises the combiners $\gamma_a$ and $C_a$.

It will be seen from Fig. 13 that by means of the control lever 181 serving for cyclic blade pitch variation adjustment, it is possible to act on said cyclic pitch variation control designated 182 in this figure through cables 183 and 184 interconnected together through the combiners $\gamma_a$ and $C_a$.

The combiner $C_a$ comprises a balance lever 185 the opposite ends of which have attached thereto the extremities of the cables 184. Said balance lever carries at 186 a pin in eccentric relation to the pivot pin 187 of the balance member 185. The pin 186 pivotally supports a bell-crank 188 connected at one end thereof through a pivotal link 189 with the longitudinal cone axis tilt angle measuring device 190. The bell-crank 188 is connected at its other end to a pivoted link 191 which includes a swivel joint at a point intermediate its length and is suitably guided in its lower portion in a guide member 191a. The link 191 carries at its lower end a follower roller 192 engaging a cam member 193 pivoted at 194 about the pivotal axis of the balance member 195 of the combiner $\gamma_a$. The balance member 195 is at its opposite ends attached to the extremities of the cable 183. That end of the lever 193 opposite to the portion thereof which forms the cam is pivoted to a link 196 which in turn is pivoted at 197 to a link 198 the opposite end of which is pivoted to one end of the balance lever 185 and another link 199 having its free end pivoted to one end of the balance lever 195.

It will be seen that the above-described device is operative to combine the control as provided by the pilot with the control as provided by the longitudinal cone-axis tilt angle in order to cause automatic variations of the desired amplitude in the cyclic blade pitch control.

It is possible through imparting a suitable contour to the cam member 193 to obtain any desired function between the longitudinal cone-axis tilt angle and the control exerted on the cyclic variation of the rotor blade pitch.

What I claim is:

1. In a device for stabilizing in flight gyroplanes having at least one rotary wing structure tiltable with respect to a fixed line of said gyroplane and including a plurality of variable pitch blades, said device being of the kind including piloting devices which are actuatable by the pilot for controlling the general pitch and the cyclic pitch of the structures and a device connected with at least one of said piloting devices for algebraically adding to the corresponding pitch determined by the pilot a value which is a function of the variations of a total angle equal to the sum of the longitudinal component of the tilt angle of at least one of said structures with respect to said fixed line and of the longitudinal component of the control angle formed by said fixed line with the perpendicular to the control plane with respect to which the chord of the cross-section of a blade makes a constant pitch angle during the rotation of said blade, in combination, a support secured to the inner end of each blade pertaining to each structure the axis tilt angle of which is to be used, a roller rotatable on said support about an axis displaced with respect to the longitudinal axis of each blade, a tiltable annulus provided with a runway for said rollers and centered on the tiltable axis of the corresponding structure, adjustable resilient means for applying said annulus against said rollers, means for adjusting said resilient means, a fork for suspending said annulus on a diameter forming with the longitudinal axis of the gyroplane an angle equal to the angle of displacement of the rotary axes of said rollers with respect to the longitudinal axis of the corresponding blade, an intermediate T-shaped member having its opposite arms pivoted to said fork around an axis parallel with the suspension axis of said annulus, a support secured to said gyroplane for journalling the central arm of said T on an axis so determined that said rollers will be adapted to rid on said annulus with a minimum amount of lateral slippage, a V-member pivoted to said fork on each side of said intermediate member on an axis parallel with said annulus suspension axis for measuring the oscillations of said annulus about an axis located in its plane and normal to said suspension axis, means for preventing displacement of said V-member out of a plane parallel with the vertical plane extending through the suspension axis of said annulus, a control horn contained in the plane of movement of said V-member, a control system connected with said horn for controlling the device of algebraic addition, a link extending from said V-member to said horn and resilient means to compensate for the effects introduced by said horn and said control system, whereby said horn is adapted to repeat the longitudinal component of the axis tilt angle of said structure as measured by said V-member.

2. In a device for stabilizing in flight gyroplanes having at least one rotary wing structure tiltable with respect to a fixed line of said gyroplane and including a plurality of variable pitch blades, said device being of the kind including piloting devices which are actuatable by the pilot for controlling the general pitch and the cyclic pitch of the structures, and a device connected with at least one of said piloting devices for algebraically adding to the corresponding pitch determined by the pilot a value which is a function of the variations of a total angle equal to the sum of the longitudinal and transverse components of the tilt angle of at least one of said structures with respect to said fixed line and of the longitudinal and transverse components of the control angle formed by said fixed line with the perpendicular to the control plane with respect to which the chord of the cross-section of a blade makes a constant pitch angle during the rotation of said blade, in combination, links pivoted at one end thereof to the inner ends of the blades pertaining to each structure the axis tilt angle of which is to be used on axes perpendicular to the longitudinal axis of said blades, a bushing slidable along the cone axis of said blades and pivotally supporting the opposite ends of said links about axes normal to said cone axis, a rod extending through said bushing and coaxial with said cone axis, a first lever rigid with and perpendicular to said rod in a plane parallel with the longitudinal plane of the gyroplane, an oscillatable support for pivoting said rod and said first lever at their point of junction about an axis perpendicular to said longitudinal plane, a second lever rigid with said support and perpendicular to said first lever, a second and fixed support to pivot said first support with said second lever at the point of junction thereof about an axis parallel to said longitudinal plane, and controls pivoted to the ends of said levers and connected with the device for algebraic summation, whereby said controls are adapted respectively to repeat the longitudinal and transverse components of said axis tilt angle as measured through said levers.

3. In a device for stabilizing in flight gyroplanes having at least one rotary wing structure tiltable with respect to a fixed line of said gyroplane and including a plurality of variable pitch blades, said device being of the kind including piloting devices which are actuatable by the pilot for controlling the general pitch and the cyclic pitch of the structures, and a device connected with at least one of said piloting devices for algebraically adding to the corresponding pitch determined by the pilot a value which is a function of the variations of a total angle equal to the sum of the component in a determined plane of the tilt angle of at least one of said structures with respect to said fixed line and of the component in said determined plane of the control angle formed by said fixed line with the perpendicular to the control plane with respect to which the chord of the cross-section of a blade makes a constant pitch angle during the rotation of said blade, in combination, levers respectively extending the longitudinal axes of the blades pertaining to each structure the axis tilt angle of which is to be used, said levers respectively having one of their ends rigid with the inner ends of said blades and being pivoted to and extending into the corresponding structure, rods parallel with the cone axis of said blades, pivoted at one end thereof to the free ends of said levers and extending under said blades, a circular disc rotatable with said structure and applied against the ends of said rods, a runway for guiding said disc, a support housing said runway, a controlling lever rigid with said support, perpendicular to the plane of said runway and parallel to the plane for which the components are to be determined, and a device connected with said controlling lever for controlling the device of algebraic summation, whereby the component of said axis tilt angle in said determined plane is measured by the displacements of said controlling lever parallel with said plane.

4. In a device for stabilizing in flight gyroplanes having at least one rotary wing structure tiltable with respect to a fixed line of said gyroplane and including a plurality of variable pitch blades, said device being of the kind including piloting devices which are actuatable by the pilot for controlling the general pitch and the cyclic pitch of the structures, and a device connected with at least one of said piloting devices for algebraically adding to the corresponding pitch determined by the pilot a value which is a function of the variations of a total angle equal to the sum of at least the component in one of the planes pertaining to a reference plane system of the tilt angle of at least one of said structures with respect to said fixed line and of at least the component in said reference plane of the control angle formed by said fixed line with the perpendicular to the control plane with respect to which the chord of the cross-section of a blade makes a constant pitch angle during the rotation of said blade, in combination, a device for measuring the tilt angle of at least one of said structures, a two-arm lever, a pivot pin for said lever, a first push-rod pivoted at one end of said two-armed lever movable in the direction of its length and connected to the axis tilt angle measuring device, a first bell crank lever pivoted to said pivot pin, a second push-rod pivoted to the end of the arm of said first bell crank lever which is perpendicular thereto, movable in the direction of its length and connected with the piloting devices, a second bell crank lever pivoted to the other arm of said first bell crank lever and having arms respectively parallel with those of said first bell crank lever, a small link connecting the end of the free arm of said first bell crank to the end of the parallel arm of said second bell crank lever, and a third push-rod pivoted to the free end of the free arm of said second bell crank lever, movable in the direction of its length and connected with the device for algebraic summation, whereby to each component of the tilt angle of the structure axis given by the measuring device is added the corresponding component of the control angle.

5. In a device for stabilizing in flight gyroplanes having at least one rotary wing structure tiltable with respect to a fixed line of said gyroplane and including a plurality of variable pitch blades, said device being of the kind including piloting devices which are actuatable by the pilot for controlling the general pitch and the cyclic pitch of the structure and a device for obtaining a total angle corresponding to the summation of at least one of the components of the tilt angle of at least one of said structures with respect to said fixed line and of the corresponding component of the control angle formed by said fixed line with the perpendicular to the control plane with respect to which the chord of the cross-section of a blade makes a constant pitch angle during the rotation of said blade, in combination, a device for measuring the tilt angle of at least one of said structures, a first lever having two equal arms, the end of one of said arms being connected with one of the piloting devices, a second lever with two equal arms similar to said first lever and parallel therewith in rest condition, the end of the arm of said second lever which corresponds to the connected arm of said first lever being connected to the device for algebraic summation, means for simultaneously connecting both said levers and altering the inclination of said second lever in response to variations in the structure axis tilt angle, and means connecting said connecting means with the rotor axis tilt angle measuring device, whereby the values of the total angle variations as transformed by the means connecting both levers is added to the pitch determined by the pilot by means of said piloting device.

6. In a device for stabilizing in flight gyroplanes having at least one rotary wing structure tiltable with respect to a fixed line of said gyroplane and including a plurality of variable pitch blades, said device being of the kind including piloting devices which are actuatable by the pilot for controlling the general pitch and the cyclic pitch of the structures and a device for obtaining a total angle corresponding to the summation of at least one of the components of the tilt angle of at least one of said structures with respect to said fixed line and of the corresponding component of the control angle formed by said fixed line with the perpendicular to the control plane with respect to which the chord of the cross-section of a blade makes a constant pitch angle during the rotation of said blade, in combination, a device for measuring the tilt angle of at least one of said structures, a first lever with two equal arms, the end of one of said arms being connected to one of the piloting devices, a second and similar lever parallel with said first lever when at rest, the end of the arm of said second lever which corresponds to the connected arm of said first lever being connected with the device for algebraic summation, a system of three rods pivoted together on a common pivot housed between both said levers, the free end of the first one of said rods being pivoted to the end of the free arm of said first lever, the free end of a second one of said rods being pivoted to the end of the corresponding arm of said second lever and the third rod having a length equal to the distance from the pivot point of said second lever to the pivot point of said second rod to said lever, a link having a length equal to said second rod pivoted to the free end of said third rod and to the pivot point of said second lever, a cam rigid with said link pivoted on the pivot point of said second lever and having a contour which is a function of the value of the structure axis tilt angle, a link connected with the tilt angle measuring device, a follower-roller on the free end of said link engaging said cam, and resilient means applying said cam against said roller, whereby the values of the total angle variations as transformed by said cam according to the contour of the same is added to the pitch determined by the pilot by means of said piloting device.

PIERRE EDOUARD RENOUX.

References Cited in the file of this patent

UNITED STATES PATENTS

| Number | Name | Date |
|---|---|---|
| 1,986,709 | Breguet et al. | Jan. 1, 1935 |
| 2,415,148 | Sikorsky | Feb. 4, 1947 |
| 2,428,200 | Campbell | Sept. 30, 1947 |
| 2,443,192 | Moeller | June 15, 1948 |
| 2,444,070 | Stanley | June 29, 1948 |
| 2,529,479 | Bates | Nov. 14, 1950 |

FOREIGN PATENTS

| Number | Country | Date |
|---|---|---|
| 892,653 | France | Jan. 13, 1944 |